United States Patent
Katsumata

(10) Patent No.: US 8,427,556 B2
(45) Date of Patent: Apr. 23, 2013

(54) IMAGE PICKUP APPARATUS WITH CONTROLLING OF SETTING OF POSITION OF CROPPING AREA

(75) Inventor: Momoe Katsumata, Niiza (JP)

(73) Assignee: Canon Kabushiki Kaisha, Tokyo (JP)

( * ) Notice: Subject to any disclaimer, the term of this patent is extended or adjusted under 35 U.S.C. 154(b) by 268 days.

(21) Appl. No.: 12/909,215

(22) Filed: Oct. 21, 2010

(65) Prior Publication Data

US 2011/0096204 A1 Apr. 28, 2011

(30) Foreign Application Priority Data

Oct. 22, 2009 (JP) .................................. 2009-243610

(51) Int. Cl.
*H04N 5/262* (2006.01)
*H04N 5/232* (2006.01)
*G03B 13/00* (2006.01)

(52) U.S. Cl.
USPC ...................... 348/240.99; 348/345

(58) Field of Classification Search ............. 348/240.99, 348/240.3, 333.03
See application file for complete search history.

(56) References Cited

U.S. PATENT DOCUMENTS

| | | | | |
|---|---|---|---|---|
| 7,046,290 B2* | 5/2006 | Nozaki | ........................ | 348/350 |
| 7,110,185 B2* | 9/2006 | Saori | ............................ | 359/666 |
| 7,515,197 B2* | 4/2009 | Suzuki | ......................... | 348/345 |
| 7,528,882 B2* | 5/2009 | Saori et al. | ..................... | 348/335 |
| 7,978,254 B2* | 7/2011 | Katsumata | ..................... | 348/345 |
| 8,194,139 B2* | 6/2012 | Ide | ........................... | 348/208.14 |
| 2004/0100560 A1 | 5/2004 | Stavely et al. | | |
| 2005/0012833 A1 | 1/2005 | Yokota et al. | | |
| 2005/0117033 A1* | 6/2005 | Matsui | ......................... | 348/239 |
| 2006/0056063 A1* | 3/2006 | Saori et al. | .................... | 359/721 |
| 2007/0230945 A1* | 10/2007 | Shiohara | ....................... | 396/374 |
| 2008/0030594 A1 | 2/2008 | Terada | | |
| 2008/0218596 A1* | 9/2008 | Hoshino | ..................... | 348/222.1 |
| 2009/0244324 A1 | 10/2009 | Saito et al. | | |
| 2010/0149383 A1* | 6/2010 | Maeda et al. | .............. | 348/240.3 |
| 2010/0214449 A1* | 8/2010 | Shimizu | ..................... | 348/240.2 |
| 2011/0157385 A1* | 6/2011 | Hoshino et al. | ......... | 348/208.99 |
| 2011/0242396 A1* | 10/2011 | Matsuzawa et al. | ..... | 348/333.08 |
| 2011/0267503 A1* | 11/2011 | Kunishige et al. | ......... | 348/240.1 |

FOREIGN PATENT DOCUMENTS

| | | |
|---|---|---|
| JP | 2005-033508 | 2/2005 |
| JP | 2009049810 A * | 3/2009 |

OTHER PUBLICATIONS

Feb. 14, 2011 European Search Report in European Patent Appln. No. 100188410.4.

* cited by examiner

*Primary Examiner* — John Villecco
(74) *Attorney, Agent, or Firm* — Fitzpatrick, Cella, Harper & Scinto

(57) ABSTRACT

A zoom magnification is calculated based on a focal length of a photographing lens obtained before zooming and the focal length of the photographing lens obtained after the zooming. Then, an object movement amount in an image pickup area of an image pickup element is calculated based on the zoom magnification and an object position obtained before the zooming. Thus, a change in the position of the cropping area is controlled.

8 Claims, 8 Drawing Sheets

IMAGE PICKUP APPARATUS WITH CONTROLLING OF SETTING OF POSITION OF CROPPING AREA

BACKGROUND OF THE INVENTION

1. Field of the Invention

The present invention relates to an image pickup apparatus, and in particular, to an image pickup apparatus including a photographing optical system with a zoom function.

2. Description of the Related Art

Image pickup apparatuses such as electronic cameras, which record images photographed using a CCD (Charge Coupled Device) or a CMOS (Complementary Metal-Oxide Semiconductor) as an image pickup element, are commonly used. Recently, many of the image pickup elements used for such applications have had more than 10 million pixels in order to increase the resolution of still images.

In image pickup apparatuses with such a high resolution image pickup element, the resolution of photographed images is reduced using a cropping method of cutting out and reading only particular pixel areas. This allows image processing to be achieved at a higher speed than reading of all the pixels.

Furthermore, for example, for single lens reflex digital cameras with which still images are conventionally photographed by using an optical viewfinder to observe fields, those which enable observation of the fields in a live-view manner and moving image photographing have started to be commercially available.

On the other hand, image pickup apparatuses are well known which have an electronic zoom function of cutting out a partial area from output image data to generate a quasi-zoom image.

In an image pickup apparatus with such an electronic zoom function, a focus adjustment area is often changed depending on the size of the partial area cut out by electronic zooming.

Furthermore, according to Japanese Patent Application Laid-Open No. 2005-033508, the position of an object is determined based on a selected focus adjustment area, and the partial area position is determined based on the position of the object. Thus, even if the object is not present in the center of the image, the object can be captured in the center of the electronic zoom image.

In the image pickup apparatus with the electronic zoom function as described above, the object is always captured in the center of the image. Thus, even if electronic zooming is performed during live-view display or moving image photographing, the photographing can be achieved without failing to place the object within the partial cutting out area.

However, in image pickup apparatuses using an optical lens with the zoom function as in, for example, the above-described single lens reflex digital camera, zooming by such an optical lens enlarges and reduces a central portion of an image pickup plane. Hence, the object may fail to be placed within the photographing area.

FIG. 8A and FIG. 8B are diagrams illustrating photographed images corresponding to the photographing area of an image pickup element when live view photographing is performed using the zoom function based on the optical lens. FIG. 8A illustrates a photographed image obtained before zooming. FIG. 8B illustrates a photographed image obtained after the zooming.

In FIG. 8A, if the object stands slightly away from the center of the photographing area, when zooming is performed without taking any appropriate measure, the object is displaced out of the displayed live-view image as illustrated in FIG. 8B because only the central area of the photographed region is enlarged.

To prevent the object from being displaced out of the displayed live-view image, the photographer needs to perform framing so as to intentionally maintain a frame image to be photographed. Furthermore, when zooming is to be performed during moving image photographing, if the photographer desires to keep the position of the object in the displayed live-view image unchanged, the framing needs to depend on the zoom amount of the optical lens.

Moreover, if the photographer cannot change a frame image to be photographed as in the case of remotely controlled photographing using a tripod or the like, the zoom function cannot be used for the object unless the object is positioned in the central portion of the image pickup plane, even if a photographing lens with an auto power zoom function is used.

SUMMARY OF THE INVENTION

In view of the foregoing, it is an aspect of the invention to provide an image pickup apparatus configured to prevent the position of an object in a photographed image from being moved in spite of zooming based on an optical lens during live-view display or moving image photographing, thus enabling live-view display without failing to place the object within the photographed image.

According to the present invention, the image pickup apparatus comprises a lens information obtaining unit configured to obtain information on a photographing lens with a zoom function, an image pickup unit configured to photoelectrically convert an object image formed on an image pickup plane by the photographing lens to generate an image signal, a cropping area setting unit configured to set a size and a position of a cropping area, an object position storing unit configured to detect and store the object position in the image pickup plane on the basis of the image signal, a focal length storing unit configured to store a focal length of the photographing lens obtained by the lens information obtaining unit, a controller configured to control the lens information obtaining unit to allow the current focal length of the photographing lens to be obtained, and to control setting of the position of the cropping area carried out by the cropping area setting unit on the basis of the focal length stored by the focal length storing unit, the current focal length and the object position stored in the object position storing unit, and a display unit configured to display the image data in accordance with the size and position of the cropping area which is set by the cropping area setting unit under control of the control unit.

Further features of the present invention will become apparent from the following description of embodiments with reference to the attached drawings.

DESCRIPTION OF THE EMBODIMENTS

Exemplary embodiments of the present invention will now be described in detail in accordance with the accompanying drawings.

First Embodiment

A first embodiment of the present invention will be described with reference to FIG. 1 to FIG. 7.

Figure 1:
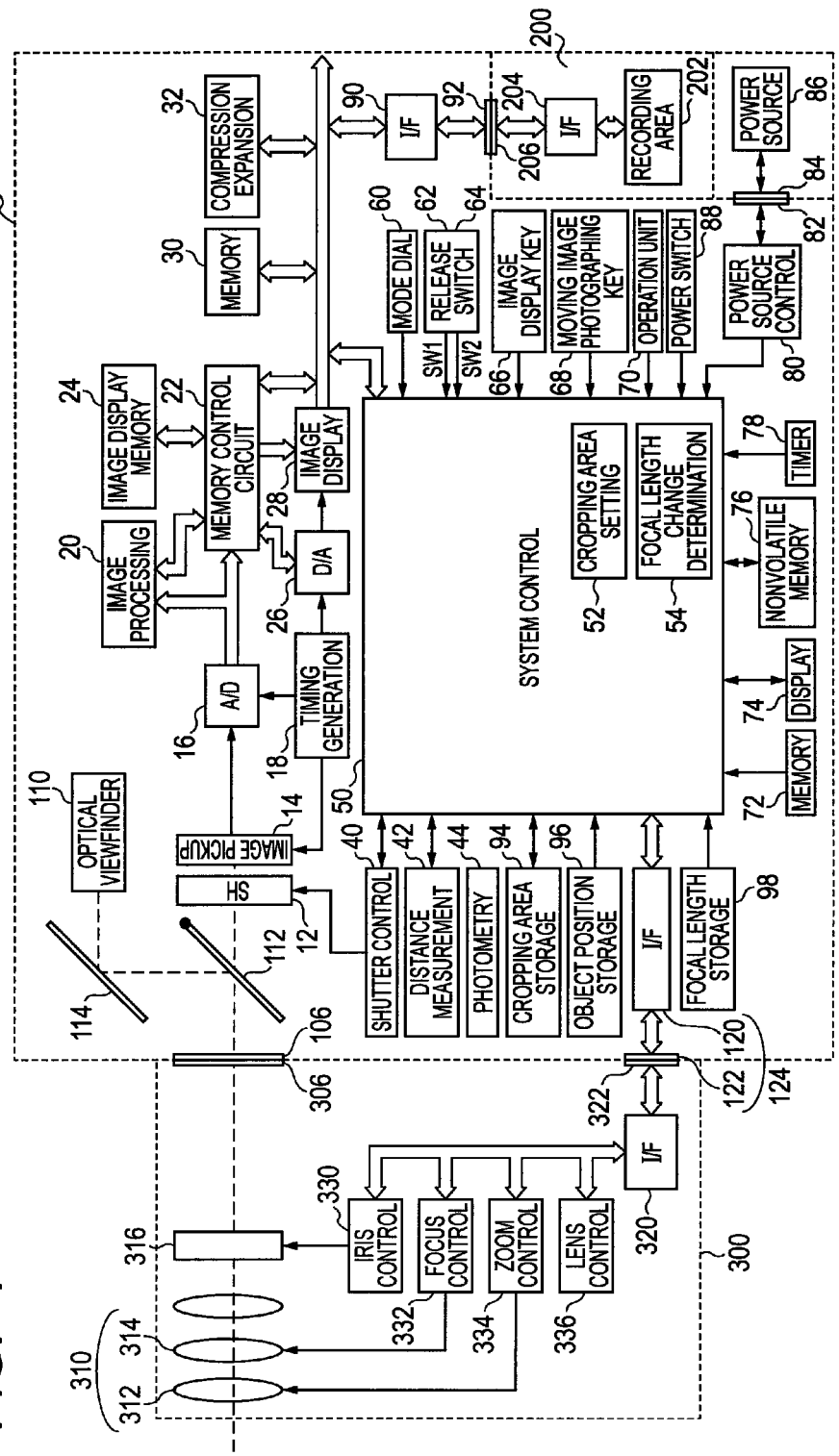
FIG. 1 is a block diagram illustrating the internal configuration of a single lens reflex digital camera according to embodiments of the present invention.

FIG. 1 is a block diagram illustrating the internal configuration of a single lens reflex digital camera according to embodiments of the present invention.

As shown in FIG. 1, the single lens reflex digital camera according to the present embodiment includes an electronic camera main body 100 forming a single lens digital camera main body, a photographing lens unit 300 including a photographing optical system with a plurality of photographing lenses 310, a recording medium 200 and a power source unit 86. Furthermore, the recording medium 200 and the power source unit 86 are detachably mounted in the electronic camera main body 100.

The photographing lens unit 300 includes a driving section configured to drive the photographing lens 310 and a light amount limitation unit configured to adjust the amount of incident light transmitted through the photographing lens 310. Furthermore, the photographing lens unit 300 is detachably disposed in the electronic camera main body 100.

Additionally, the electronic camera main body 100 is configured as follows.

A shutter 12 controls the exposure amount of the image pickup element 14. An image pickup element 14 converts an optical image into an electric signal and is, for example, a CCD sensor or a CMOS sensor. Light incident on the photographing lens 310 is guided via an iris 316 corresponding to the light amount limitation unit, lens mounts 306 and 106, a mirror 112 and the shutter 12. The light is then formed into an optical image on an image pickup plane of the image pickup element 14.

Furthermore, light incident on the photographing lens 310 via mirrors 112 and 114 is guided by an optical viewfinder 110. In the description below, the mirror 112 is a quick return mirror but may be configured as a half mirror.

An A/D converter 16 converts an analog signal output from the image pickup element 14 into a digital signal (hereinafter referred to as image data).

A timing generation circuit 18 supplies clock signals and control signals to the image pickup element 14, the A/D converter 16 and a D/A converter 26. The timing generation circuit 18 is controlled by a memory control circuit 22 and a system control circuit 50.

An image processing circuit 20 carries out a predetermined pixel interpolation process and a predetermined color conversion process on one of image data from the A/D converter 16 and image data from the memory control circuit 22. Furthermore, the image processing circuit 20 uses image data to carry out predetermined arithmetic processing as required. Based on arithmetic processing results obtained, the system control circuit 50 carries out AF (Auto Focus) processing based on a TTL (Through The Lens) method, AE (Automatic Exposure control) processing and EF (strobe flash adjustment) processing to control a focus adjustment unit 42 (hereinafter referred to as a distance measurement unit) and a photometry unit 44. Moreover, the image processing circuit 20 is configured to carry out a WB (White Balance) process.

The memory control circuit 22 controls the A/D converter 16, the timing generation circuit 18, the image processing circuit 20, the image display memory 24, the D/A converter 26, a memory 30, and a compression/expansion circuit 32. The image data output by the A/D converter 16 is written to one of the image display memory 24 and the memory 30 via the image processing circuit 20 and memory control circuit 22 or only via the memory control circuit 22.

The image display memory 24, the D/A converter 26 and an image display section 28 (for example, a TFT or an LCD) carries out processing required for image display. Specifically, display image data written to the image display memory 24 is output to the image display section 28 via the D/A converter 26 for display. When image data picked up by the image pickup element 14 is sequentially displayed using the image display section 28, live-view display (a finder function provided before and after photographing to display moving images picked up by the image pickup element 14) can be realized. Alternatively, the image data recorded in a recording area 202 of the recording medium 200 may be read, subjected to predetermined processing by the compression/expansion circuit 32, and then displayed on the image display section 28 via the image display memory 24 and the D/A converter 26.

The memory 30 is a storage medium in which photographed still and moving images are stored. The memory 30 has a storage capacity sufficient to store a predetermined number of still images and a predetermined time of moving images. Thus, even in continuous photographing in which a plurality of still images is continuously photographed, a large amount of images can be written to the memory 30 at a high speed. Furthermore, the memory 30 can be used as a work area for the system control circuit 50.

The compression/expansion circuit 32 compresses and expands image data by adaptive discrete cosine transform (ADCT). The compression/expansion circuit 32 reads the image data stored in the memory 30, carries out one of a compression process and an expansion process on the image data, and then writes the processed image data to the memory 30.

The shutter control circuit 40 cooperates with an iris control circuit 330 configured to control the iris 316, to control the shutter 12 on the basis of photometry information from the photometry unit 44. The distance measurement unit 42 carries out AF (AutoFocus) processing. That is, the distance measurement unit 42 forms light incident on the photographing lens 310 into an optical image on an AF sensor (not shown in the drawings) in the distance measurement unit 42 via the iris 316, the lens mounts 306 and 106, the mirror 112 and distance measurement submirror (not shown in the drawings), thus measuring the in-focus state of images.

The photometry unit 44 is a photometry apparatus configured to carry out an AE (AutoExposure) process. The photometry unit 44 forms light incident on the photographing lens 310 into an optical image on a photometry sensor (not shown in the drawings) in the photometry unit 44 via the iris 316, the lens mounts 306 and 106, the mirror 112 and a photometry lens (not shown in the drawings), thus measuring the exposure state of images.

The photometry unit 44 is configured to be able to also carry out AF processing and AE processing using a contrast AF method in which the system control circuit 50 controls the shutter control circuit 40, the iris control circuit 330 and the distance measurement control circuit 332 on the basis of the results of calculation, by the image processing circuit 20, of image data picked up by the image pickup element 14.

The system control circuit 50 controls the whole electronic camera main body 100. A memory 72 is configured to store constants, variables, programs and the like which are used to operate the system control circuit 50. The system control circuit 50 is used as a determination unit and a control unit in various operations of the electronic camera main body 100.

A cropping area setting unit 52 is provided in the system control circuit 50 to store the size of a cropping area set by the photographer using the operation section 70, in a cropping area storing unit 94. Furthermore, based on a change in the focal length of the photographing lens 310, the cropping area setting unit 52 changes the size and position of the cropping area and stores the changed size and position in the cropping area storing unit 94.

A focal length change determination unit 54 is provided in the system control circuit 50. The focal length change determination unit 54 compares the focal length stored in a focal length storing unit 98 with the current focal length of the photographing lens 310 obtained by a lens communication unit 124 to determine whether or not the focal length has been changed.

A mode dial 60, a release switch SW1 (62) and a release switch SW2 (64) are an operation unit configured to input various operation instructions for the system control circuit 50. Each of the dial and switches includes a combination of one or more of a switch, a dial, a touch panel, pointing based on viewpoint detection, an audio recognition apparatus, and the like.

Now, these operation units will be specifically described. The mode dial 60 is a rotary switch that enables switching and setting of functional photographing modes such as an auto-photographing mode, a program photographing mode, a shutter-priority photographing mode, an iris-priority photographing mode, a manual photographing mode, a still image photographing mode, and a moving image photographing mode.

The release switch SW1 (62) is turned on during operation of a release button (not shown in the drawings) to give an instruction to start an operation for one of AF (AutoFocus) processing, AE (AutoExposure) processing, WB (White Balance) processing, and EF (strobe flash adjustment) processing. The release switch SW2 (64) is turned on when operation of the release button (not shown in the drawings) is complete to give an instruction to start an operation for a series of processes including an exposure process of reading a signal from the image pickup element 14 and writing corresponding image data to the memory 30 via the A/D converter 16 and the memory control circuit 22, a development process using calculations in the image processing circuit 20 and the memory control circuit 22, and a recording process of reading the image data from the memory 30, allowing the compression/expansion circuit 32 to compress the image data, and writing the compressed image data to the recording medium 200.

An image display button 66 can be used to set the image display section 28 to be turned on and off. When images are photographed using the optical viewfinder 110, this function can be used to interrupt the supply of current to the image display section 28, including an LCD, thus saving power.

A moving image photographing button 68 allows moving image photographing to be started when turned on for the first time and allows the moving image photographing to be ended when turned on for the second time.

An operation section 70 includes the various buttons and the touch panel. The operation section 70 includes, for example, a menu button, a set button, a multi-screen reproduction page feed button, a flash setting button, a single photographing/continuous photographing/self timer switching button, a menu selection + (plus) button, a menu selection − (minus) button, a photographing image quality selection button, an exposure correction button, a date/time setting button and an enter/execution button.

The selection/switching button is used to set selection and switching of various functions to be performed in order to carry out photographing and reproduction. The enter/execution button is used to set the various functions to be entered and executed in order to carry out photographing and reproduction.

To set the size of the cropping area, the photographer uses a cropping area setting menu so as to operate the plus button, minus button and enter/execution button on the operation section 70 to determine the size of the cropping area. For example, one of a plurality of preset cropping area sizes may be selected and decided.

The memory 72 is configured to store constants, variables, programs, and the like for the operation of the system control circuit 50.

A display section 74 has a display function provided in, for example, a liquid crystal display to display an operational state and messages using characters, images, and audio messages in response to execution of the appropriate program by the system control circuit 50, and a sound generation function provided in, for example, speakers to generate operation sounds and warning sounds in response to execution of the appropriate program by the system control circuit 50. One or more display sections 74 are installed at an easily visually recognizable position close to the operation section of the electronic camera main body 100. The display section 74 includes, for example, a combination of an LCD, an LED and a sound generation element.

A nonvolatile memory 76 is an electrically erasable and recordable memory, and the contents of the memory 72 are recorded in the nonvolatile memory 76 as required. For example, an EEPROM is used as the nonvolatile memory 76.

A timer 78 measures elapsed time.

A power source control circuit 80 includes a battery detection circuit, a DC-DC converter, and a switch circuit configured to switch a block to be energized. The power source control circuit 80 detects the type of a battery and the remaining battery charge to control the DC-DC converter based on the results of the detections and instructions from the system control circuit 50. The power source control circuit 80 supplies each of the sections including the recording medium with the required voltage for a required period. Connectors 82 and 84 are used to connect the electronic camera main body 100 to the power source unit 86. The power source unit 86 includes a primary battery such as an alkaline battery or a lithium battery, a secondary battery such as a NiCd battery, an NiMH battery, or an Li battery, and an AC adapter.

A power source switch 88 enables the power-on and power-off modes of the electronic camera main body 100 to be switched and set. Furthermore, power source switch 88 also enables various accessory devices such as the photographing lens unit 300 connected to the electronic camera main body 100, an external strobe (not shown in the drawings) and the recording medium 200 to be powered on and off.

An interface 90 is used for a recording medium such as a memory card or a hard disk. A connector 92 is connected to the recording medium such as a memory card or a hard disk.

The cropping area storing unit 94 is configured to store the size and position of the cropping area set by the cropping area setting unit 52 in the system control circuit 50.

An object position storing unit 96 is configured to store an in-focus position resulting from AF processing carried out by the distance measurement unit 42 or contrast AF, as an object position. Furthermore, the object position storing unit 96 is configured to store the object position in a live-view image, obtained based on the in-focus position and an object movement amount calculated by the system control circuit 50.

The focal length storing unit 98 is configured to store the focal length obtained by the photographing lens communication unit 124 through communication.

A lens communication interface 120 is provided in the lens mount 106 to allow the electronic camera main body 100 to be connected to the photographing lens unit 300. A lens communication connector 122 is used to electrically connect the electronic camera main body 100 to the photographing lens unit 300. The photographing lens communication unit 124 includes the lens communication interface 120 and the lens communication connector 122.

The lens communication connector 122 transmits control signals, status signals, data signals, and the like between the electronic camera main body 100 and the photographing lens unit 300. The lens communication connector 122 also has a function of supplying currents with various voltages. Furthermore, the connector 122 may be configured to transmit not only electric communication but also optical communication and audio communication.

The recording medium 200 is a memory card or a hard disk. The recording medium 200 includes the recording area 202 formed of a semiconductor memory, a magnetic disk, or the like, an interface 204 to the electronic camera main body 100 and a connector 206 connected to the electronic camera main body 100. Image data is recorded in the recording area 202. Furthermore, image pickup information is recorded in the recording medium 200 in association with image data, as image pickup information data.

Now, the above-described photographing lens unit 300 will be described in further detail. The photographing lens unit 300 is of a replacement lens type as described above.

The lens mount 306 allows the photographing lens unit 300 to be mechanically coupled to the electronic camera main body 100. The lens mount 306 contains various functions allowing the photographing lens unit 300 to be electrically connected to the electronic camera main body 100.

The photographing lens 310 includes a zoom lens 312 and a focus lens 314. The zoom lens 312 is controlled by a zoom lens control unit 334 so as to have the position thereof moved in a photographing optical axis direction to enable zooming. The zooming allows a change in the angle of view for image pickup carried out by the image pickup element 14.

The focus lens 314 is controlled by a focus lens control unit 332 so as to have the position thereof moved in the photographing optical axis direction to enable the focus of the photographing lens 310 to be adjusted.

An interface 320 is provided in the lens mount 306 to connect the photographing lens unit 300 to the electronic camera main body 100. A connector 322 is used to electrically connect the photographing lens unit 300 to the electronic camera main body 100. The connector 322 transmits control signals, status signals, data signals and the like between the electronic camera main body 100 and the lens unit 300. The connector 322 also has a function of receiving or supplying currents with various voltages.

The iris control circuit 330 cooperates with the shutter control circuit 40 configured to control the shutter 12, in controlling the iris 316 based on photometry information from the photometry unit 44. The focus lens control circuit 332 moves the position of the focus lens 314 to control the adjustment of focus of the photographing lens 310.

The zoom lens control unit 334 moves the position of the zoom lens 312 to control the zooming of the photographing lens 310. The lens system control circuit 336 controls the whole photographing lens unit 300. The lens system control circuit 336 also has the functions of the memory in which the constants, variables, programs and the like for operations are stored and the functions of the nonvolatile memory configured to hold identification information such as the unique number of the photographing lens unit 300, management information, function information such as an open iris value, a minimum iris value and the focal length, the current and past set values, and the like. In response to an instruction from the electronic camera main body 100, the lens system control circuit 336 transmits the function information to the electronic camera main body 100 via the interface 320 and the connector 322.

Now, with reference to FIG. 2 to FIG. 4 and FIG. 7, an operation will be described which is performed if zooming is carried out during live-view display in the still image photographing mode, which corresponds to a first embodiment of the present invention.

Figure 2:
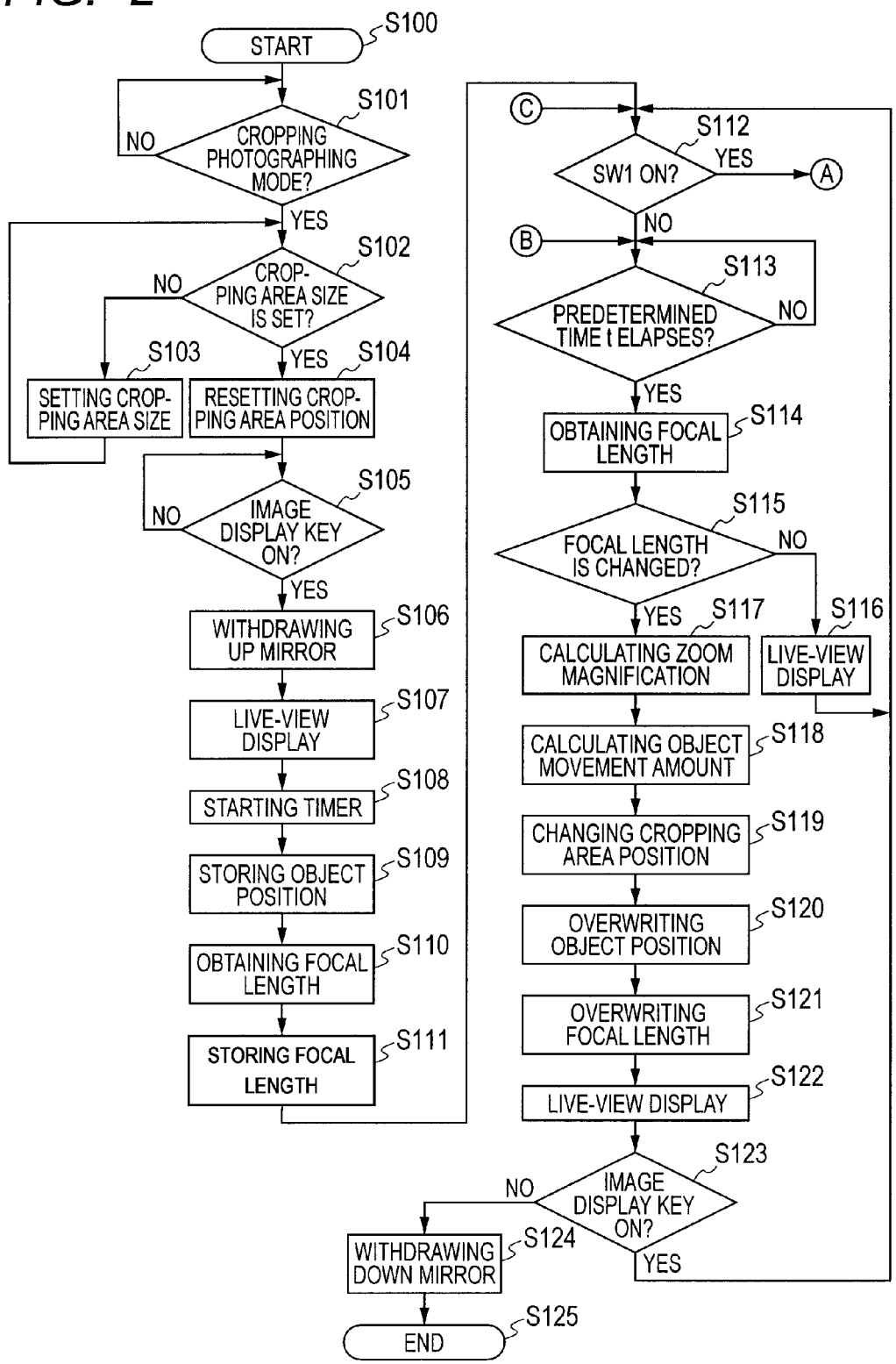
FIG. 2 is a flowchart of operations and a processing procedure used by an electronic camera main body 100 to perform zooming during live-view display in a still image photographing mode.
Figure 3:
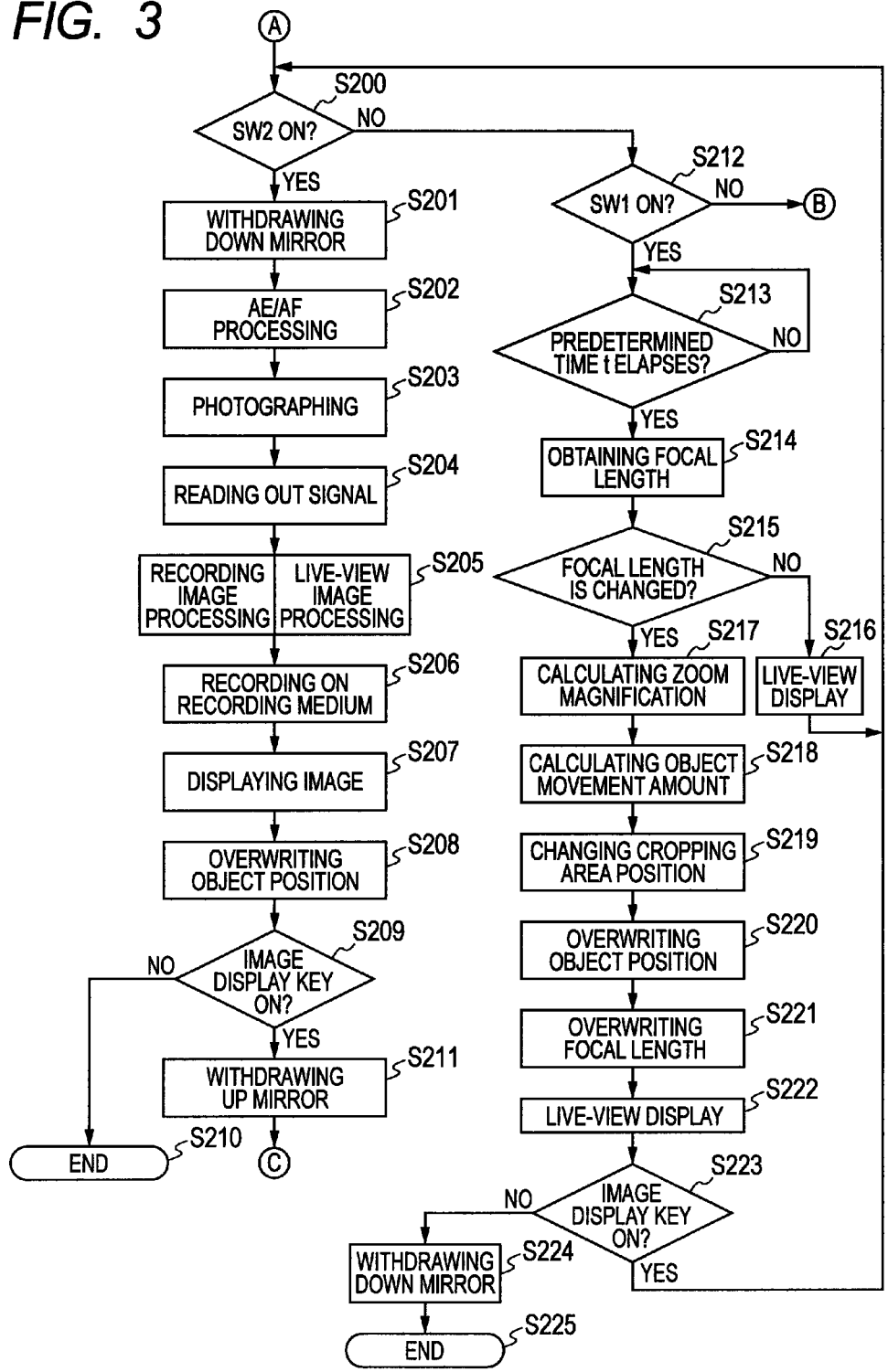
FIG. 3 is a flowchart of operations and a processing procedure used by the electronic camera main body 100 to perform zooming during live-view display in the still image photographing mode.

FIG. 2 and FIG. 3 are flowcharts illustrating operations and a processing procedure used by the image pickup apparatus to perform zooming during live-view display in the still image photographing mode, which corresponds to a first embodiment of the present invention.

As illustrated in FIG. 2, when the processing is started, the system control circuit 50 determines whether or not the current photographing mode is cropping photographing mode (step S101). If the current photographing mode is not cropping photographing mode (NO in step S101), the determination for the cropping photographing mode is repeated. At this time, the live-view display is in a normal photographing mode. The present invention relates to cropping photographing. Thus, the description of normal photographing is omitted.

In step S101, if the current photographing mode is determined to be in the cropping photographing mode (YES in step S101), the system control circuit 50 determines whether or not the size of the cropping area has been set by the cropping area setting unit 52 and stored in the cropping area storing unit 94 (step S102).

If the size of the cropping area has not been set or stored in the cropping area storing unit 94 (NO in step S102), the system control circuit 50 notifies the photographer using the display section 74 that the cropping area has not been set, to prompt the photographer to set the size of the cropping area using the operation section 70. The set size of the cropping area is stored in the cropping area storing unit 94 (step S103).

In step S102, if the size of the cropping area has been set (YES in step S102), the system control circuit 50 resets the position of the cropping area stored in the cropping area storing unit 94 and initializes the position to the origin (the center of a photographing screen) (step S104).

Subsequently, the system control circuit 50 determines whether or not the image display button 66 has been turned on (step S105). If the image display button 66 has been turned off (NO in step S105), the system control circuit 50 repeats the operation of determining whether or not the image display button 66 has been turned on.

In step S105, if the image display button 66 has been turned on (YES in step S105), the system control circuit 50 withdraws up the mirror 112 (step S106) and then uses the image display section 28 to provide live-view display (step S107). The system control circuit 50 resets the timer 78 to "0" and then starts the timer (step S108).

Figure 4:
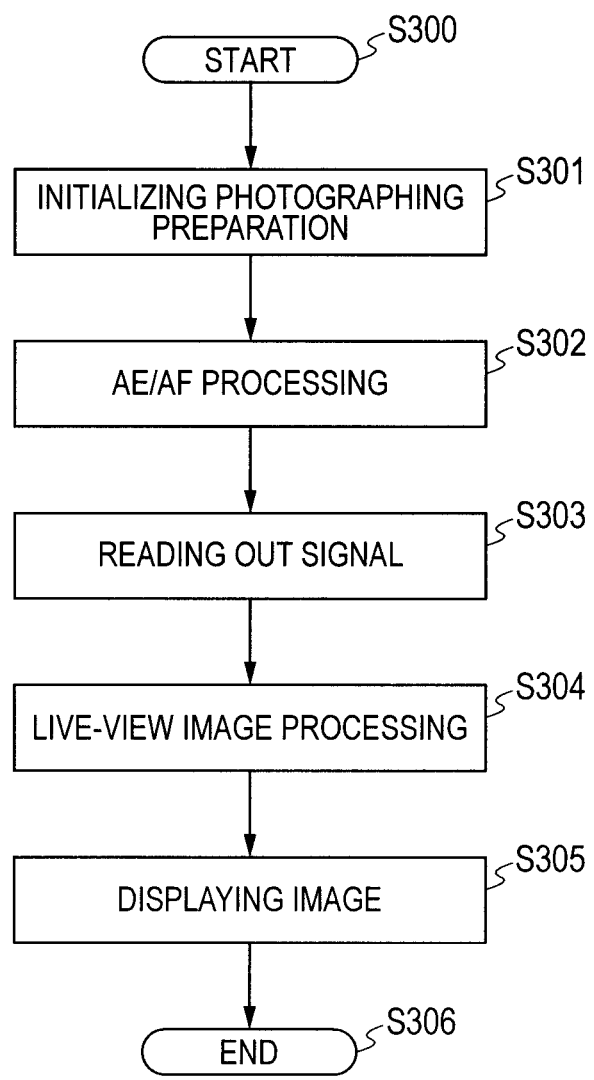
FIG. 4 is a flowchart illustrating a live-view display operation.

Now, a live-view display operation will be described with reference to the flowchart in FIG. 4. FIG. 4 is a flowchart illustrating a live-view display operation.

First, the system control circuit 50 carries out initialization for photographing preparation to allow live-view images to be displayed on the image display section 28 (step S301).

In single lens reflex digital cameras, the image pickup element 14 is generally shielded from light by the mirror 112 and the shutter 12 except during exposure. Thus, for AF and AE, the image pickup element 14 is not used but an AF sensor and an AE sensor for a particular application are separately disposed to receive light which is incident via the photographing lens 310 and which is then divided into optical paths.

However, for live-view display, the mirror 112 is flipped up to open the shutter 12 to bring the image pickup element 14 into an exposure state. In this state, light is prevented from reaching the AF sensor in the distance measurement unit 42 and the AE sensor in the photometry unit 44. Thus, the sensors will fail to carry out AF and AE. Hence, the contrast AF and image pickup plane AE functions are used in order to carry out AF and AE during live-view display (step S302).

The system control circuit 50 controls the timing generation circuit 18 to allow an analog signal to be read from the image pickup element 14 at a frame rate timing for live-view display (step S303). The analog signal read from the image pickup element 14 is converted into a digital signal by the A/D converter 16. The digital signal is then subjected to image processing for live-view display by the image processing circuit 20 and the memory control circuit 22. The resultant image data is stored in the image display memory 24 (step S304). The image data stored in the image display memory 24 is then displayed on the image display section 28 via the memory control circuit 22 and the D/A converter 26 (step S305). The operations in step S302 to step S305 are sequentially repeated to implement live-view display.

In step S109 in FIG. 2, the in-focus position resulting from the contrast AF in step S302 in FIG. 4 is defined as an object position and stored in the object position storing unit 96 (step S109).

Then, the system control circuit 50 communicates with the photographing lens unit 300 via the lens communication interface 120 and lens communication connector 122, corresponding to the photographing lens communication unit 124, to obtain the current focal length of the photographing lens 310 (step S110). The system control circuit 50 stores the current focal length in the focal length storing unit 98 (step S111).

Subsequently, the system control circuit 50 determines whether or not the release switch SW1 (62) has been turned on (step S112). If the release switch SW1 (62) has been turned on (YES in step S112), the system control circuit 50 proceeds to step S200 in FIG. 3.

If the release switch SW1 (62) has been turned off (NO in step S112), the system control circuit 50 determines whether or not the elapsed time in the timer 78 has reached a preset predetermined time (t) (step S113). The predetermined time (t) is based on the frame rate for the live-view display and is about 0.03 second if the frame rate is 30 fps.

If the elapsed time in the timer 78 has not reached the predetermined time (t) (NO in step S113), the determination operation is repeated until the predetermined time (t) is reached.

If the elapsed time in the timer 78 has reached the predetermined time (t) (YES in step S113), the system control circuit 50 communicates with the photographing lens unit 300 to obtain the current focal length of the photographing lens 310 again (step S114). The focal length change determination unit 54 determines whether or not the focal length obtained is different from the focal length stored in the focal length storing unit 98 (step S115).

If the two focal lengths are the same (NO in step S115), this means that zooming has not been carried out. The system control circuit 50 thus provides live-view display again (step S116) and proceeds to step S112. If the two focal lengths are different (YES in step S115), this means that zooming has changed the angle of view. Thus, the system control circuit 50 calculates a zoom magnification from those two focal lengths (step S117).

Subsequently, the system control circuit 50 calculates the object movement amount in the image pickup plane of the image pickup element 14 from the zoom magnification calculated in step S117 and the object position stored in the object position storing unit 96 (step S118). The cropping area setting unit 52 sets the position of the cropping area on the basis of the calculated object movement amount and changes the position of the cropping area stored in the cropping area storing unit 94 (step S119). That is, the image pickup apparatus (100) according to the present invention includes the control unit (50) operating in accordance with the cropping photographing mode in the following manner. The control unit controls the lens information obtaining unit to allow the current focal length of the photographing lens to be obtained. The control unit further controls setting, by the cropping area setting unit, of the position of the cropping area on the basis of the focal length stored in the focal length storing unit, the current focal length and the object position stored in the object position storing unit. In this configuration, when zooming is performed using the optical lens, the position of the cropping area can be changed depending on the zoom magnification to provide live-view display without displacing the object out of the displayed image during the zooming.

Moreover, the system control circuit 50 calculates the object position in the live-view image from the object movement amount calculated in step S118. The system control circuit 50 overwrites the object position stored in the object position storing unit 96, with the calculated object position, which is thus stored in the object position storing unit 96 (step S120). Furthermore, the focal length stored in the focal length storing unit 98 is overwritten with the focal length of the photographing lens 310 obtained in step S113, which is thus stored in the focal length storing unit 98 (step S121).

Then, based on the position of the cropping area set in step S119, the system control circuit 50 provides live-view display (step S122) and then determines whether or not the image display button 66 has been turned on (step S123). If the image display button 66 has been turned on (YES in step S123), the system control circuit 50 returns to step S112. If the image display button 66 has been turned off (NO in step S123), the system control circuit 50 withdraws down the mirror 112 (step S124) and ends the live view operation (step S125).

In step S112 in FIG. 2, if the release switch SW1 (62) has been turned on (YES in step S112), the system control circuit 50 determines whether or not the release switch SW2 (64) has been turned on (step S200 in FIG. 3). If the release switch SW2 (64) has not been turned on (NO in step S200), the system control circuit 50 proceeds to step S212.

In step S200 in FIG. 3, if the release switch SW2 (64) has been turned on (YES in step S200), the system control circuit 50 withdraws down the mirror 112 (step S201). When the mirror 112 is withdrawn down, object light is incident on the AF sensor in the distance measurement unit 42 and the AE sensor in the photometry unit 44; the AF and AE sensors are exposed to the object light. Thus, signal charges are accumulated in the sensors for a predetermined time. After the accumulation, the system control circuit 50 reads an analog signal output for the accumulated signal charges from each of the sensors. The system control circuit 50 then carries out AF (AutoFocus) processing and AE (AutoExposure) processing (step S202). Then, photographing is performed (step S203).

Then, the system control circuit 50 controls the timing generation circuit 18 to allow an analog signal to be read from the image pickup element 14. The A/D converter 16 converts the analog signal into a digital signal. The system control circuit 50 then stores the digital signal in the image memory 30 (step S204).

Two image data, namely image data to be recorded in the recording medium 200 and image data for live-view display, are created from the image data stored in the image memory 30. The image data to be recorded in the recording medium 200 is subjected to a predetermined development process and a predetermined compression process by the image processing circuit 20 in accordance with a JPEG method. The processed image data is stored in the image memory 30 again. Furthermore, the image data for live-view display is subjected to image processing such as a predetermined development process, a predetermined pixel thinning-out process and a predetermined compression process on the basis of the number of pixels in the image display section 28. The processed image data is stored in the image display memory 24 (step S205).

The image data to be recorded in the recording medium 200 which has been stored in the image memory 30 is written to and recorded in the recording area 202 of the recording medium 200 (step S206).

Furthermore, the image data for live-view display stored in the image display memory 24 is displayed on the image display section 28 via the memory control circuit 22 and the D/A converter 26 (step S207).

The system control circuit 50 specifies the in-focus position resulting from the AF (AutoFocus) processing in step S202, as an object position. The system control circuit 50 then overwrites the object position stored in the object position storing unit 96 with the specified object position, which is then stored in the object position storing unit 96 (step S208).

Then, the system control circuit 50 determines whether or not the image display button 66 has been turned on (step S209). If the image display button 66 has been turned off (NO in step S209), the system control circuit 50 ends the processing (step S210). If the image display button 66 has been turned on (YES in step S209), the system control circuit 50 withdraws up the mirror 112 (step S211) and then proceeds to step S112 in FIG. 2.

Step S212 to step S225 in FIG. 3 involve the same operations as those in step S112 to step S125 in FIG. 2 and will thus not be described below.

As described above, the image pickup apparatus according to the present invention is configured as follows. The focal length change determination unit (54) compares the focal length stored in the focal length storing unit with the current focal length to determine whether or not the focal length of the photographing lens (310) has been changed. If the focal length change determination unit (54) determines that the focal length of the photographing lens (310) has not been changed, the cropping area setting unit is controlled so as not to change the setting of the size and position of the cropping area. If the focal length change determination unit (54) determines that the focal length of the photographing lens (310) has been changed, the cropping area setting unit is controlled so as to change the position of the cropping area on the basis of the focal length stored in the focal length storing unit, the current focal length and the object position stored in the object position storing unit.

Figure 7A:
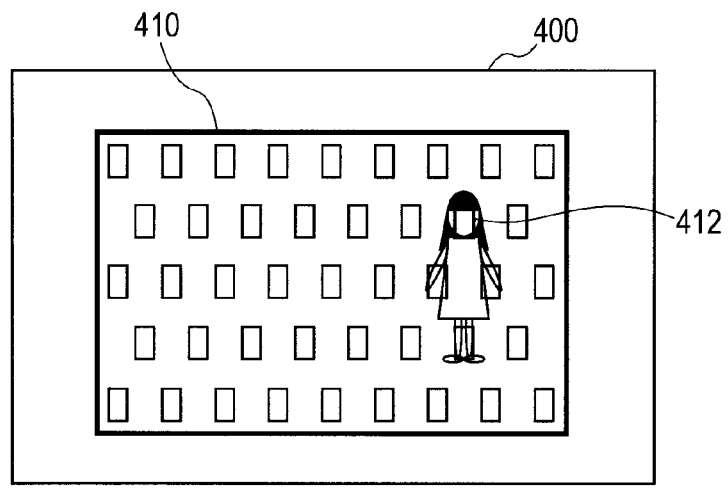
FIG. 7A, FIG. 7B and FIG. 7C are diagrams illustrating live view images obtained before and after zooming according to a first embodiment of the present invention.
Figure 7B:
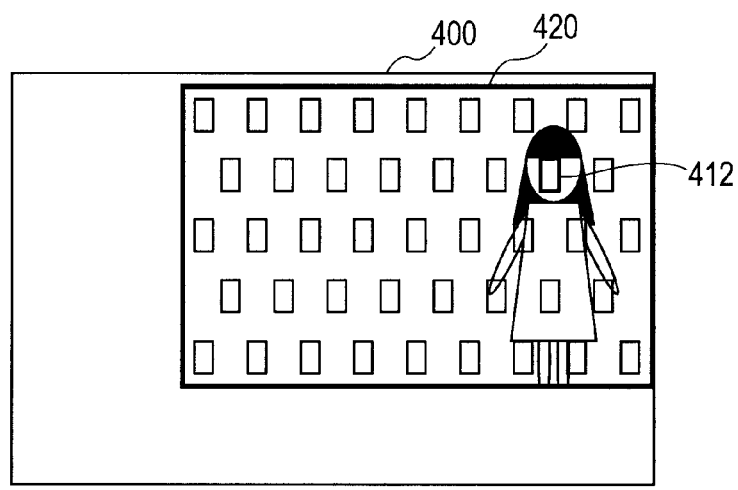
Figure 7C:
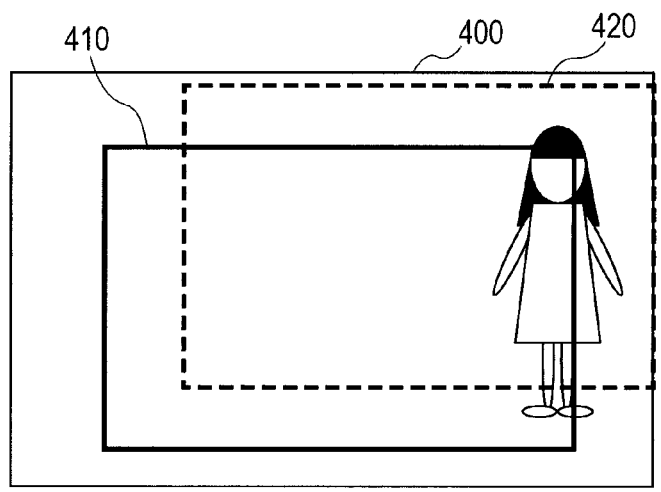
Figure 8A:
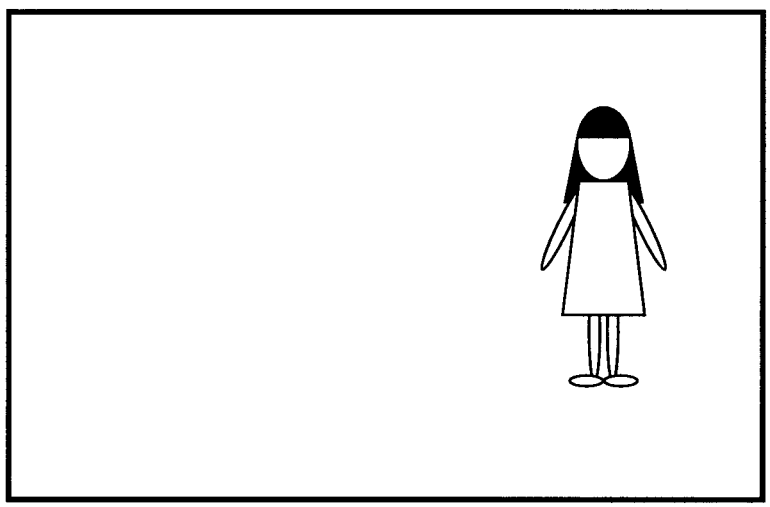
FIGS. 8A and 8B are diagrams illustrating photographed images corresponding to a photographing area of an image pickup element if live view photographing is performed using a zoom function based on an optical lens in accordance with the prior art.
Figure 8B:

FIG. 7A, FIG. 7B and FIG. 7C are diagrams illustrating the position of the cropping area in live-view display according to the first embodiment of the present invention.

FIG. 7A is a diagram illustrating the cropping area obtained before zooming. A photographing enabled area of the image pickup element 14 is illustrated at 400. The cropping area obtained before the zooming is illustrated at 410. The in-focus position resulting from the contrast AF in step S302 in FIG. 4 is illustrated at 412.

FIG. 7B is a diagram illustrating the position of the cropping area obtained after the zooming. The cropping area obtained after zooming is illustrated at 420. The object position in the image pickup plane moves concurrently with the zooming. The position of the cropping area changes from 410 to 420 based on the object movement amount calculated in step S118 in FIG. 2.

FIG. 7C is a diagram illustrating the relationship between the position of cropping area before the zooming and the position of the cropping area after the zooming. When the cropping area is shifted from 410 to 420 as illustrated in FIG. 7B, the object position in the live-view image is prevented from being moved and remains at 412 in spite of the zooming.

As described above, the image pickup apparatus according to the first embodiment of the present invention includes the photographing lens (310) with the zoom function, the lens information obtaining unit (124) configured to obtain information on the photographing lens (310), and the image pickup element (14) configured to photoelectrically convert the object image formed on the image pickup plane by the image pickup lens (310), into an image signal. The image pickup apparatus also includes the cropping photographing mode in which the cropping area is set in a part of the image pickup plane of the image pickup element (14) so that an image signal is read from the cropping area to generate image data. In the cropping photographing mode, the image data is displayed in accordance with the size and position of the cropping area set in the cropping area setting unit under the control of the above-described control unit. Thus, live-view display can be provided without failing to place the object within the displayed image area in spite of zooming. Moreover, the position of the object in the live-view display image is prevented from being moved in spite of the zooming. Hence, the appropriate live-view display can be provided without the need for framing performed by the photographer. Furthermore, since the photographer need not perform framing, even if in remotely-operated photographing using a tripod, zooming is performed using the optical lens, live-view display can be provided without failing to place the object within the photographing area.

Second Embodiment

A second embodiment of the present invention will be described with reference to FIG. 5 and FIG. 6.

Figure 5:
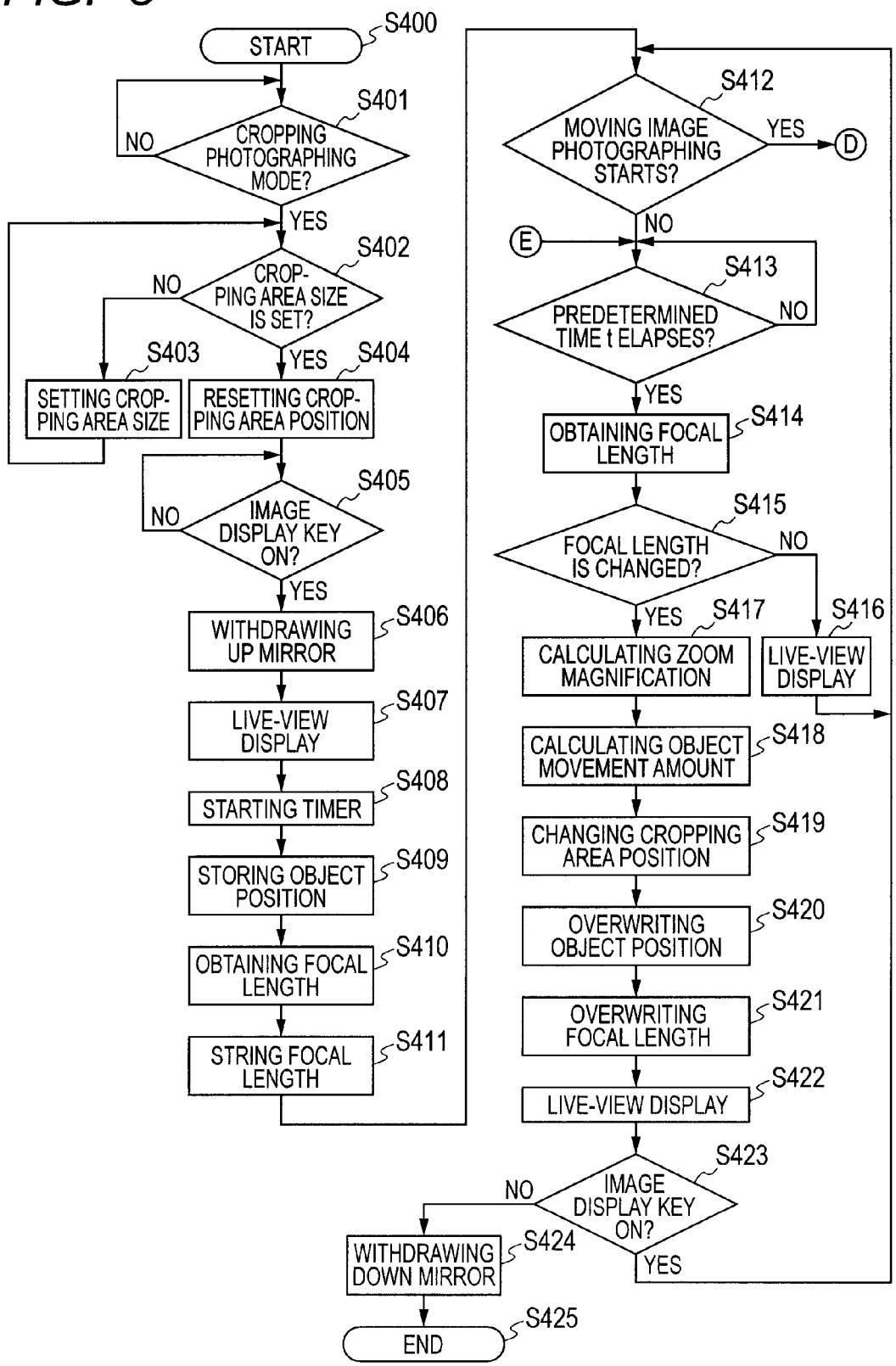
FIG. 5 is a flowchart of operations and a processing procedure used by an image pickup apparatus to perform zooming in a moving image photographing mode.
Figure 6:
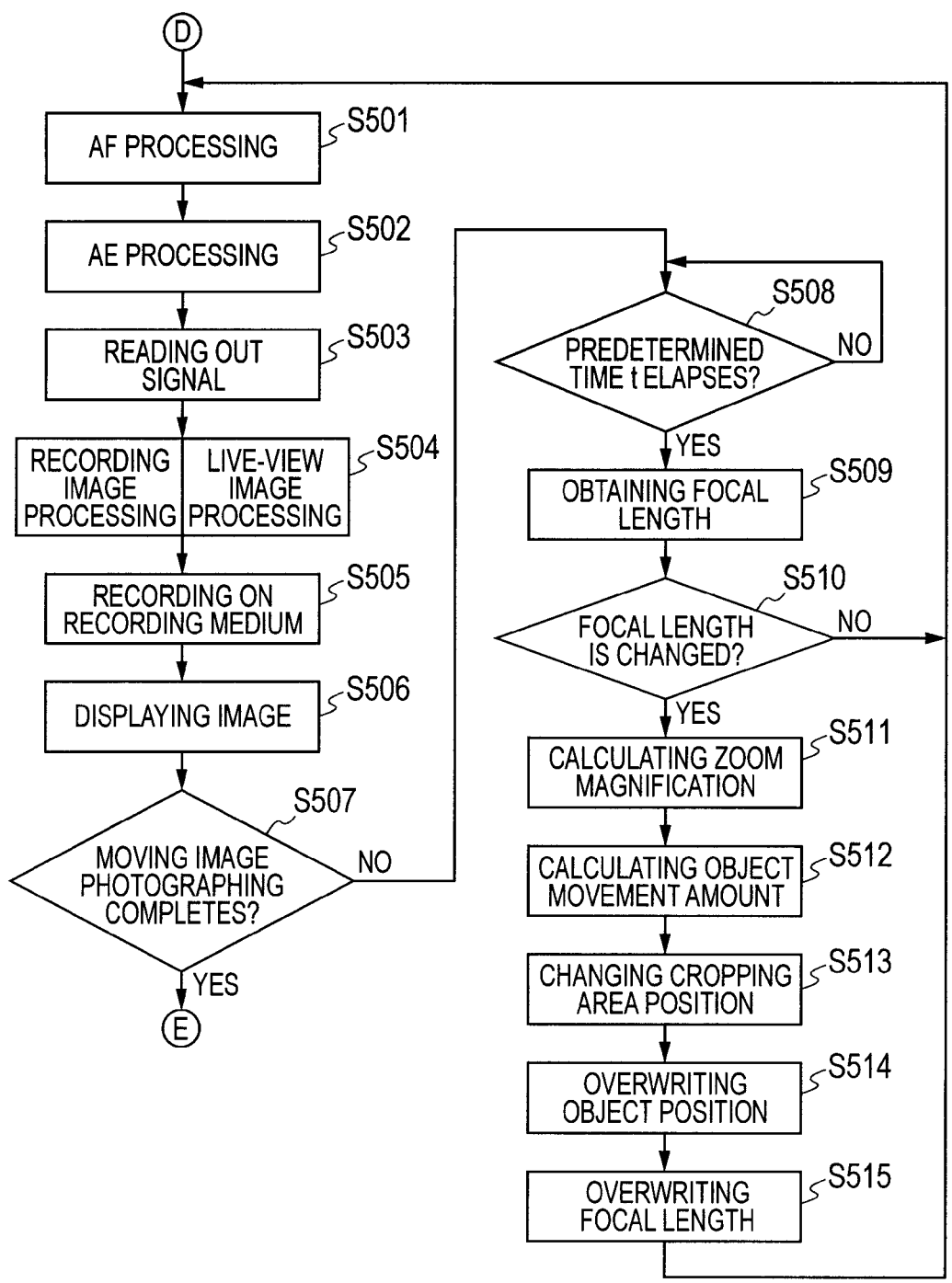
FIG. 6 is a flowchart of operations and a processing procedure used by the image pickup apparatus to perform zooming in the moving image photographing mode.

FIG. 5 and FIG. 6 are flowcharts illustrating operations and a processing procedure used by an image pickup apparatus to perform zooming in a moving image photographing mode corresponding to an embodiment of the present invention.

Step S401 to step S411 in FIG. 5 involve the same operations as those in step S101 to step S111 in FIG. 2 and will thus not be described below.

In step S412, a system control circuit 50 determines whether or not a moving image photographing button 68 has been turned on to start moving image photographing (step S412). If the moving image photographing button 68 has been turned on to start the moving image photographing (YES in step S412), the system control circuit 50 proceeds to step S500 in FIG. 6.

If the moving image photographing button 68 has not been turned on and thus the moving image photographing has not been started (NO in step S412), the system control circuit 50 proceeds to step S413.

Step S413 to step S425 involve the same operations as those in step S113 to step S125 in FIG. 2 and will thus not be described below.

In step S412 in FIG. 5, if the moving image photographing button 68 has been turned on to start the moving image photographing (YES in step S412), an image processing circuit 20 carries out a predetermined distance measurement calculation on a signal obtained from the image pickup element 14. The image processing circuit 20 stores the result of the calculation in a memory 30. Based on the calculation result, the system control circuit 50 uses the distance measurement unit 42 to carry out AF processing (step S501).

Subsequently, the image processing circuit 20 carries out a predetermined photometry calculation on a signal obtained from the image pickup element 14. The image processing circuit 20 stores the result of the calculation in a system memory 32. The system control circuit 50 carries out an AE process on the basis of the calculation result (step S502).

Then, a moving image process in a series of photographing operations is carried out. The system control circuit 50 controls a timing generation circuit 18 to allow an analog signal to be read from the image pickup element 14. An A/D converter 16 converts the analog signal into a digital signal, which is then stored in the image memory 30 (step S503).

Two image data, namely image data to be recorded in a recording medium 200 and image data for live-view display, are created from the image data stored in the image memory 30 in step S503. The image data to be recorded in the recording medium 200 is subjected to a predetermined development process and a predetermined compression process by the image processing circuit 20 in accordance with the JPEG method. The processed image data is stored in the image memory 30 again. Furthermore, the image data for live-view display is subjected to image processing such as a predetermined development process, a predetermined pixel decimation process and a predetermined compression process on the basis of the number of pixels in an image display section 28. The processed image data is stored in an image display memory 24 (step S504).

The image data to be recorded in the recording medium 200 which has been stored in the image memory 30 is written to and recorded in a recording area 202 of the recording medium 200 as the first frame of a moving image file (step S505).

Furthermore, the image data for live-view display stored in the image display memory 24 is displayed on the image display section 28 via a memory control circuit 22 and a D/A converter 26 (step S506).

Then, the system control circuit 50 determines whether or not the moving image photographing button 68 has been turned on again to end the moving image photographing (step S507).

If the moving image photographing button 68 has been turned on again to end the moving image photographing (YES in step S507), the system control circuit 50 proceeds to step S413 in FIG. 5.

In step S507, if the moving image photographing button 68 has not been turned on again and the moving image photographing is continued (NO in step S507), the system control circuit 50 determines whether or not the elapsed time in a timer 78 has reached a preset predetermined time (t) (step S508).

If the elapsed time in a timer 78 has not reached the preset predetermined time (t) (NO in step S508), the system control circuit 50 repeats the determination operation until the predetermined time (t) is reached.

If the elapsed time in a timer 78 has reached the preset predetermined time (t) (YES in step S508), the system control circuit 50 communicates with a photographing lens unit 300 to obtain the current focal length of a photographing lens 310 (step S509). The system control circuit 50 then determines whether or not the current focal length is different from the focal length stored in a focal length storing unit 98 (step S510).

If the two focal lengths are the same (NO in step S510), this means that zooming has not been carried out. The system control circuit 50 thus proceeds to step S501.

If the two focal lengths are different (YES in step S510), this means that zooming has been carried out. Thus, the system control circuit 50 proceeds to step S511.

Step S511 to step S515 following the above-described steps involve the same operations as those in step S112 to step S121 in FIG. 2 and will thus not be described below.

In step S515, the focal length stored in the focal length storing unit 98 is overwritten with the focal length of the photographing lens 310, which is thus stored in the focal length storing unit 98. The system control circuit 50 then proceeds to step S501.

As described above, the image pickup apparatus according to the second embodiment of the present invention includes the moving image photographing mode in which moving images are photographed and recorded. In photographing in the moving image photographing mode, the control unit can control setting of the position of the cropping area in accordance with the cropping photographing mode. That is, the focal length change determination unit (54) compares the focal length stored in the focal length storing unit with the current focal length to determine whether or not the focal length of the photographing lens (310) has been changed. If the focal length change determination unit (54) determines that the focal length of the photographing lens (310) has not been changed, the control unit controls the cropping area setting unit so that the cropping area setting unit does not change the set size and position of the cropping area. If the focal length change determination unit determines that the focal length of the photographing lens has been changed, the control unit controls the cropping area setting unit so that the cropping area setting unit changes the position of the cropping area on the basis of the focal length stored in the focal length storing unit, the current focal length and the object position stored in the object position storing unit. Thus, even if in photographing in the moving image photographing mode, zooming is performed using the optical system photographing lens, since the position of the cropping area is changed depending on the zoom magnification, live-view display and moving image photographing can be achieved without failing to place the object within the photographed image in spite of the optical zooming. Furthermore, the object position is prevented from being moved in the moving image during the optical zooming. Thus, the live-view display of photographed image of the object and the moving image photographing can be easily achieved without a framing operation performed by the photographer. Moreover, even if remotely-operated photographing is performed with the image pickup apparatus fixed with a tripod or the like, the live-view display and the moving image photographing can be achieved without the need for framing, which prevents the object from being displaced out of the photographing area.

The present invention has been described in detail based on the embodiments thereof. However, the present invention is not limited to these particular embodiments but encompasses various aspects without departing from the spirits thereof. The above-described embodiments may be appropriately partly combined with one another.

Furthermore, in the description of the first and second embodiments, the image pickup apparatus is a single lens reflex digital camera with the detachably mounted electronic camera main body 100 and photographing lens unit 300. However, the photographing lens 310 may be included in the electronic camera main body 100.

Furthermore, in the configuration of the present invention described above, the control by the system control circuit 50 may be performed by one piece of hardware or the relevant processing may be shared by plural pieces of hardware so as to achieve the control of the whole apparatus.

The present invention is implemented by carrying out the following processing. Software (computer program) configured to implement the functions of the above-described embodiments is supplied to one of a system and an apparatus via one of a network (communication) and any of various computer-readable recording media. A computer (or a CPU or an MPU) in one of the system and the apparatus reads and executes a program code. In this case, the software and a recording medium in which the software is recorded as the computer program code form the present invention.

The above-described embodiments are only typical examples. In practice, many variations and changes may be made to the present embodiments.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2009-243610, filed Oct. 22, 2009, which is hereby incorporated by reference herein in its entirety.

What is claimed is:
1. An image pickup apparatus comprising:
a lens information obtaining unit configured to obtain information on a photographing lens with a zoom function;
an image pickup unit configured to photoelectrically convert an object image formed on an image pickup plane by the photographing lens to generate an image signal;
a cropping area setting unit configured to set a size and a position of a cropping area;
an object position storing unit configured to detect and store the object position in the image pickup plane on the basis of the image signal;
a focal length storing unit configured to store a focal length of the photographing lens obtained by the lens information obtaining unit;
a controller configured to control the lens information obtaining unit to allow the current focal length of the photographing lens to be obtained, wherein the controller controls setting of the position of the cropping area carried out by the cropping area setting unit on the basis of the focal length stored by the focal length storing unit, the current focal length and the object position stored in the object position storing unit; and
a display unit configured to display the image data in accordance with the size and position of the cropping area which is set by the cropping area setting unit under control of the control unit.

2. The image pickup apparatus according to claim 1, further comprising a focal length change determination unit configured to compare the focal length stored in the focal length storing unit with the current focal length to determine whether or not the focal length of the photographing lens has been changed,
wherein the controller performs first control if the focal length change determination unit determines that the focal length of the photographing lens has not been changed, and performs second control if the focal length change determination unit determines that the focal length of the photographing lens has been changed,
wherein in the first control, the controller controls the cropping area setting unit in such a manner that the cropping area setting unit does not change the size and position of the cropping area, and
wherein in the second control, the controller controls the cropping area setting unit in such a manner that the cropping area setting unit changes the position of the cropping area on the basis of the focal length stored in the focal length storing unit, the current focal length and the object position stored in the object position storing unit.

3. The image pickup apparatus according to claim 2, wherein in the second control, the focal length storing unit is controlled so as to store the current focal length, and the object position storing unit is controlled so as to change the object position stored in the object position storing unit in accordance with the changed position of the cropping area and to store the changed object position.

4. The image pickup apparatus according to claim 1, wherein the controller controls the lens information obtaining unit to allow the current focal length to be obtained every predetermined time, thus controlling setting of the position of the cropping area.

5. The image pickup apparatus according to claim 1, wherein if the cropping photographing mode is set, the controller controls the cropping area setting unit to allow the set position of the cropping area to be initialized.

6. The image pickup apparatus according to claim 1, wherein the image pickup apparatus has a moving image photographing mode in which a moving image is photographed and recorded, and wherein the controller controls setting of the position of the cropping area in the moving image photographing mode.

7. A control method of an image pickup apparatus including a photographing lens with a zoom function and an image pickup element configured to photoelectrically convert an object image formed on an image pickup plane by the photographing lens to generate an image signal, comprising the steps of:

obtaining information on the photographing lens with the zoom function;

setting a size and a position of a cropping area;

detecting and storing the object position in the image pickup plane on the basis of the image signal;

storing a focal length of the photographing lens obtained in the lens information obtaining step;

controlling the lens information obtaining step to allow the current focal length of the photographing lens to be obtained and to control setting of the position of the cropping area carried out in the cropping area setting step on the basis of the focal length stored in the focal length storing step, the current focal length and the object position stored in the object position storing step; and displaying the image data in accordance with the size and position of the cropping area which is set in the cropping area setting step under control of the control unit.

8. A non-transitory computer-readable recording medium storing a computer program comprising a program code for causing a computer to execute the control method according to claim 7.

* * * * *